(12) United States Patent
Hill et al.

(10) Patent No.: US 7,487,305 B2
(45) Date of Patent: Feb. 3, 2009

(54) PRIORITIZED BUS REQUEST SCHEDULING MECHANISM FOR PROCESSING DEVICES

(75) Inventors: David L. Hill, Cornellus, OR (US); Derek T. Bachand, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 2 days.

(21) Appl. No.: 11/557,183

(22) Filed: Nov. 7, 2006

(65) Prior Publication Data

US 2007/0094462 A1    Apr. 26, 2007

Related U.S. Application Data

(63) Continuation of application No. 11/095,623, filed on May 11, 2004, now Pat. No. 7,133,981, which is a continuation of application No. 10/454,625, filed on Jun. 5, 2003, now Pat. No. 6,782,457, which is a continuation of application No. 10/245,329, filed on Sep. 18, 2002, now Pat. No. 6,606,692, which is a continuation of application No. 09/474,010, filed on Dec. 28, 1999, now Pat. No. 6,499,090.

(51) Int. Cl.
  *G06F 12/00* (2006.01)
(52) U.S. Cl. .................................................... 711/158
(58) Field of Classification Search ................. 711/151, 711/158; 710/309, 310
  See application file for complete search history.

(56) References Cited

U.S. PATENT DOCUMENTS

| | | | |
|---|---|---|---|
| 4,956,820 A | 9/1990 | Hashimoto |
| 5,524,220 A | 6/1996 | Verma et al. |
| 5,537,573 A | 7/1996 | Ware et al. |
| 5,586,294 A | 12/1996 | Goodwin et al. |
| 5,638,534 A | 6/1997 | Mote, Jr. |
| 5,701,426 A | 12/1997 | Ryan |
| 5,706,482 A | 1/1998 | Matsushima et al. |
| 5,740,399 A | 4/1998 | Mayfield et al. |
| 5,761,452 A | 6/1998 | Hooks et al. |
| 5,761,706 A | 6/1998 | Kessler et al. |
| 5,790,813 A | 8/1998 | Whittaker |

(Continued)

FOREIGN PATENT DOCUMENTS

EP    0391517    7/1997

(Continued)

OTHER PUBLICATIONS

Palacharla et al, "Evaluating Stream Buffers as a Secondary Cache Replacement", 1994, IEEE, pp. 24-33.

(Continued)

*Primary Examiner*—Hiep T Nguyen
(74) *Attorney, Agent, or Firm*—Kenyon & Kenyon LLP

(57) ABSTRACT

A scheduler stores data to be scheduled. The scheduler may include an array that identifies relative priorities among the queue entries according to a first priority scheme, such as by age. The scheduler also may include a priority register array identifying relative priorities among the queue entries according to a second priority scheme, such as by data type. A plurality of detectors coupled to the array and to the priority register array may determine which data is to be scheduled next.

20 Claims, 5 Drawing Sheets

U.S. PATENT DOCUMENTS

| | | | |
|---|---|---|---|
| 6,178,466 B1 * | 1/2001 | Gilbertson et al. | 710/3 |
| 6,272,600 B1 | 8/2001 | Talbot et al. | |
| 6,286,083 B1 | 9/2001 | Chin et al. | |
| 6,499,090 B1 | 12/2002 | Hill et al. | |
| 6,606,692 B2 | 8/2003 | Hill et al. | |
| 6,782,457 B2 | 8/2004 | Hill et al. | |
| 7,133,981 B2 | 11/2006 | Hill et al. | |

FOREIGN PATENT DOCUMENTS

| | | |
|---|---|---|
| WO | 94/08301 | 4/1994 |
| WO | 96/41271 | 12/1996 |

OTHER PUBLICATIONS

Jouppi et al, "Tradeoffs in Twi-Level On-Chip Caching", 1994, IEEE, pp. 34-45.

Wakerly, John F., Digital Design Principles and Practices, Third Edition, Updated, 2001, Chapter 10, pp. 866-872, Prentice Hall, Upper Saddle River, New Jersey.

* cited by examiner

100

200

300

400

1000

500

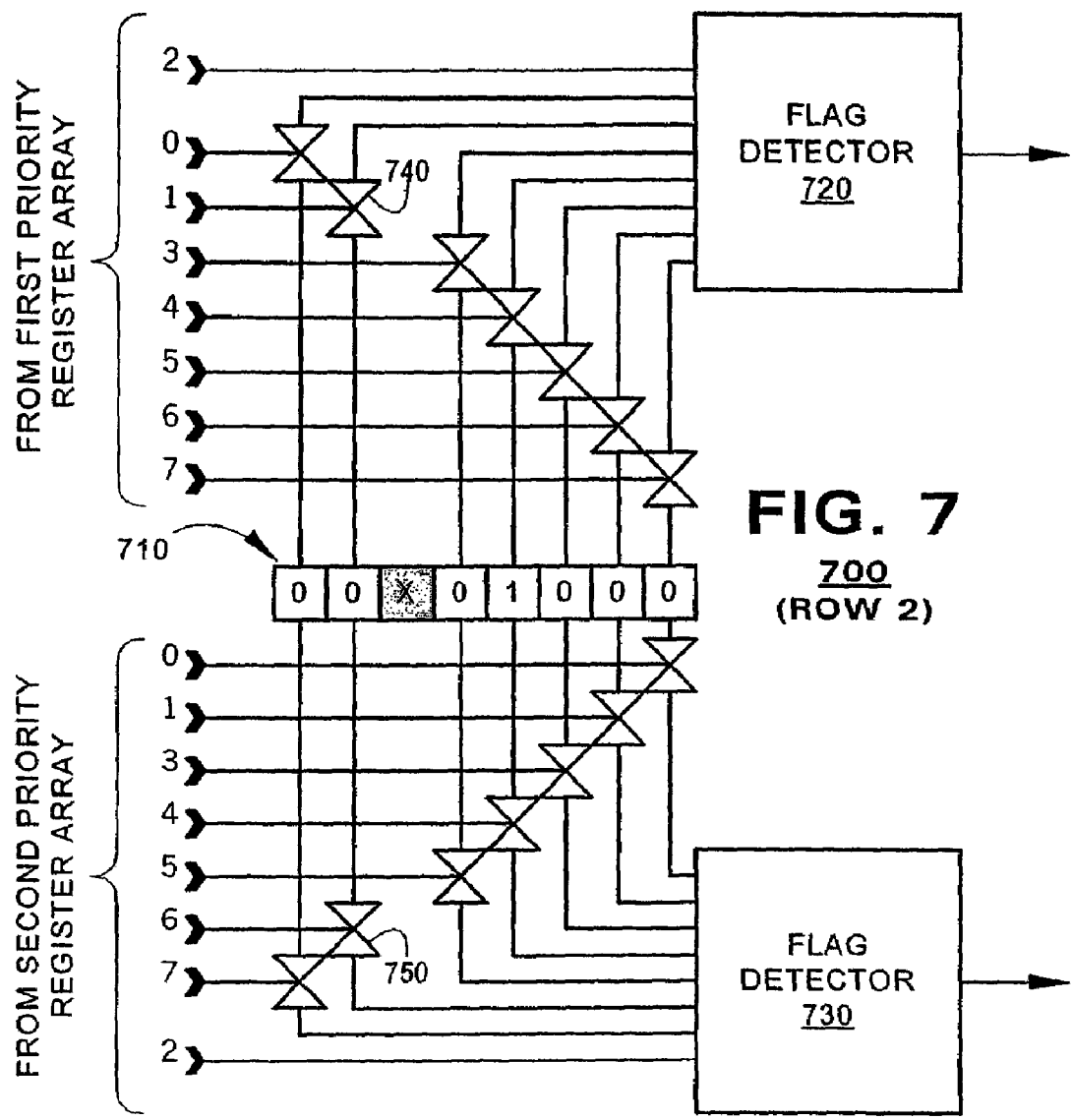

PRIORITIZED BUS REQUEST SCHEDULING MECHANISM FOR PROCESSING DEVICES

This application is a continuation application that claims the benefit of U.S. patent application Ser. No. 11/095,623, which is to issue as U.S. Pat. No. 7,133,981 on Nov. 7, 2006; which is a continuation of U.S. Pat. No. 6,782,457, issued Aug. 24, 2004; which is a continuation of U.S. Pat. No. 6,606,692, issued Aug. 12, 2003; which is a continuation of U.S. Pat. No. 6,499,090, issued Dec. 24, 2002, which application and patents are incorporated herein in their entirety.

BACKGROUND

The present invention relates to a scheduler for use in processor devices and other agents.

As is known, many modern computing systems employ a multi-agent architecture. A typical system is shown in FIG. 1. There, a plurality of agents 110-160 communicates over an external bus 170 according to a predetermined bus protocol. "Agents" may include general-purpose processors 110-140, memory controllers 150, interface chipsets 160, input output devices and/or other integrated circuits (not shown) that process data requests. The bus 170 may permit several external bus transactions to be in progress at once.

In multi-agent systems, the bandwidth of the external bus 170 can define a limit to system performance. Clock speeds within an agent typically are much faster than clock speeds of the external bus. A processor core (not shown) for example can issue many data requests (read requests and write requests) in the time that the external bus 170 can execute a single request. Further, an agent must share the external bus 170 with other agents. These factors can introduce unwanted latency to the processing of data requests within an agent.

Not all data requests are created equal. Currently, Intel Corporation, the assignee of the present invention, is designing an agent that will process core read requests, prefetch requests and write requests. Core read requests are requests for addressed data to be read to the agent's processing core ("core"). Typically, core read requests identify data for which the agent has an immediate need. Prefetch requests, by contrast, refer to data that is likely to be used by the core in the not-so-distant future. By prefetching the data into the agent prior to the time the core actually issues a read request for it, the data should be available to the core in an internal cache. The internal cache may operate at a faster clock rate than the external bus and, therefore, may satisfy the expected core request with reduced latency. Write requests typically identify data that is being returned by the agent to system storage. The data may be evicted because the agent is no longer using it and new data is being read to a memory location that the evicted data occupied. Other data requests may be associated with other priorities.

Given the bandwidth limitations of an external bus and the relative priorities observed with respect to the different data requests handled within an agent, the inventors determined that there is a need in the art for a bus control algorithm that schedules requests to be posted on the external bus according to a predetermined priority scheme.

SUMMARY

Embodiments of the present invention provide a scheduler that stores data to be scheduled. The scheduler may include an array identifying relative priorities among the queue entries according to a first priority scheme, and a priority register array identifying relative priorities among the queue entries according to a second priority scheme. A plurality of detectors may be coupled to the array and to the priority register array to determine which data is to be scheduled.

BRIEF DESCRIPTION OF THE DRAWINGS

FIG. 7 is a block diagram illustrating communications between a row in a priority matrix array and associated flag detectors according to one embodiment of the present invention.

DETAILED DESCRIPTION

Embodiments of the present invention provide a prioritized scheduler for a transaction management system of an agent. The scheduler may include a priority matrix that determines which of a plurality of stored requests should be posted on the external bus. The priority matrix may maintain an account of the stored requests according to a first priority scheme, such as age. The priority matrix also may include masks associated with each request type. When scheduling a request, the priority matrix may apply the highest priority non-empty mask to the array. The oldest request associated with the request type may be identified for scheduling.

Figure 2:
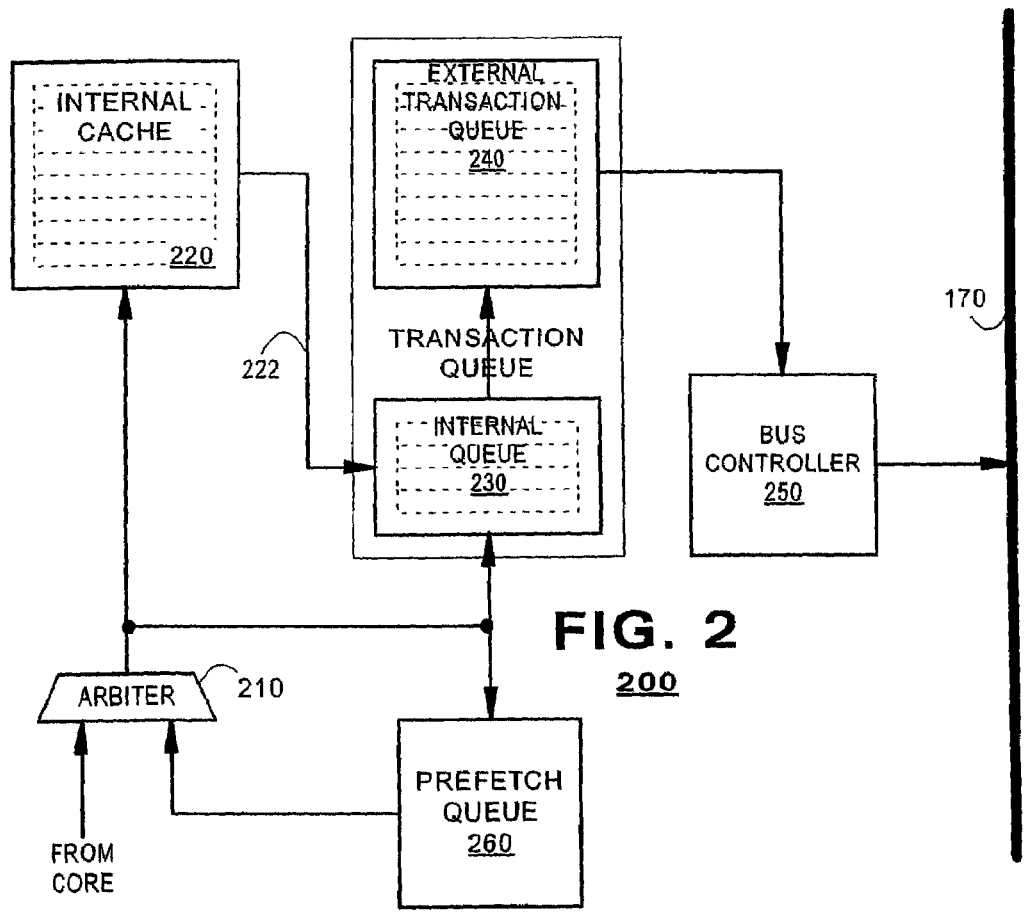
FIG. 2 illustrates an embodiment of a processor according to an embodiment of the present invention.

FIG. 2 illustrates a transaction management system 200 according to an embodiment of the present invention. Transaction managers are known per se. They may include an arbiter 210, a cache memory 220, an internal transaction queue 230, an external transaction queue 240 and an external bus controller 250. The arbiter 210 receives requests from a variety of sources, such as from the core and perhaps the external transaction queue 240. Requests typically include a request code representing the type of request being made and, where appropriate, an address identifying data on which the request is to be performed. The arbiter 210 prioritizes the requests and implements them in the order of priority.

The cache 220 may be an internal memory. Typically, the cache 220 may be a unified cache, one that stores both instruction data and variable data (collectively, "data"). Requests from the arbiter 210 may be input to both the cache 220 and to the internal transaction queue 230. For read requests, the cache 220 may include control logic (not shown) that can determine whether the requested data is stored in the cache 220. If so, the request is said to "hit" the cache 220. The cache 220 will furnish the requested data to the core over a communication path (also not shown). Otherwise, the request is said to "miss" the cache. The cache 220 may communicate a hit or a miss to the internal transaction queue 230 over a line 222.

The internal transaction queue 230 may include control circuitry and buffer memory to process requests from the arbiter 210. Each request issued by the arbiter 210 is placed in the internal transaction queue 230. The internal transaction queue 230 also receives hit/miss indicators from the cache 220. If a request hits the cache 220, the internal transaction queue 230 permits the queued request to terminate as it advances out of the queue 230. But if a request misses the cache 220, the request should be completed by retrieving the requested data from an external memory (not shown). In this case, when the request advances out of the internal transaction queue 230, the internal transaction queue 230 causes the request to be entered in the external transaction queue 240.

The external transaction queue 240 also may include control circuitry and buffer memory. It may cause external bus transactions to be posted on the external bus 170 pursuant to queued requests issued from within the processor. The external transaction queue 240 may control operation of the bus 170 via the external bus controller 250. Typically, a bus protocol will have been defined for the bus 170, the external transaction queue 240 and external bus controller 250 may generate and receive signals in accordance with such a protocol.

In an alternate embodiment, the internal transaction queue 230 and external transaction queue 240 may be replaced by a unitary queue. Accordingly, FIG. 2 illustrates the internal transaction queue 230 and external transaction queue 240 as included in a single "transaction queue." The principles of the present invention find application with either embodiment.

Typically, an external bus transaction that reads data causes data of a predetermined unit size to be read to the processor. For example, a single bus transaction may cause 64 bytes of data to be read to the processor. This predetermined unit size often is referred to as a "cache line." Different systems have different cache line sizes. Thus, although a processor may require data of only a portion of a cache line, the processor may read the entire cache line. From the cache line, the processor will use as much data as is required by its program flow.

An embodiment of the present invention may provide a prefetch queue 260 in a transaction management system 200. The prefetch queue 260 may monitor requests issued by the arbiter 210 and determine whether read requests exhibit one or more predetermined patterns. When a core issues a series of read requests to sequential memory locations (e.g., A, A+1, A+2, or B, B−1, B−2), it may indicate that the core is advancing through a regular, ordered progression of instructions or data. If any such pattern is identified, the prefetch queue 260 may issue a read request to be issued. The read request may be made prior to a core request for the same data. Prefetching may contribute to improved processor performance by having data stored in the internal cache 220 prior to the time the core 200 requests the data. If the data is present in the cache 220 when the core 200 needs the data, the core 200 will not be forced to wait for an external bus transaction to complete before the core 200 can use the data.

Figure 3:
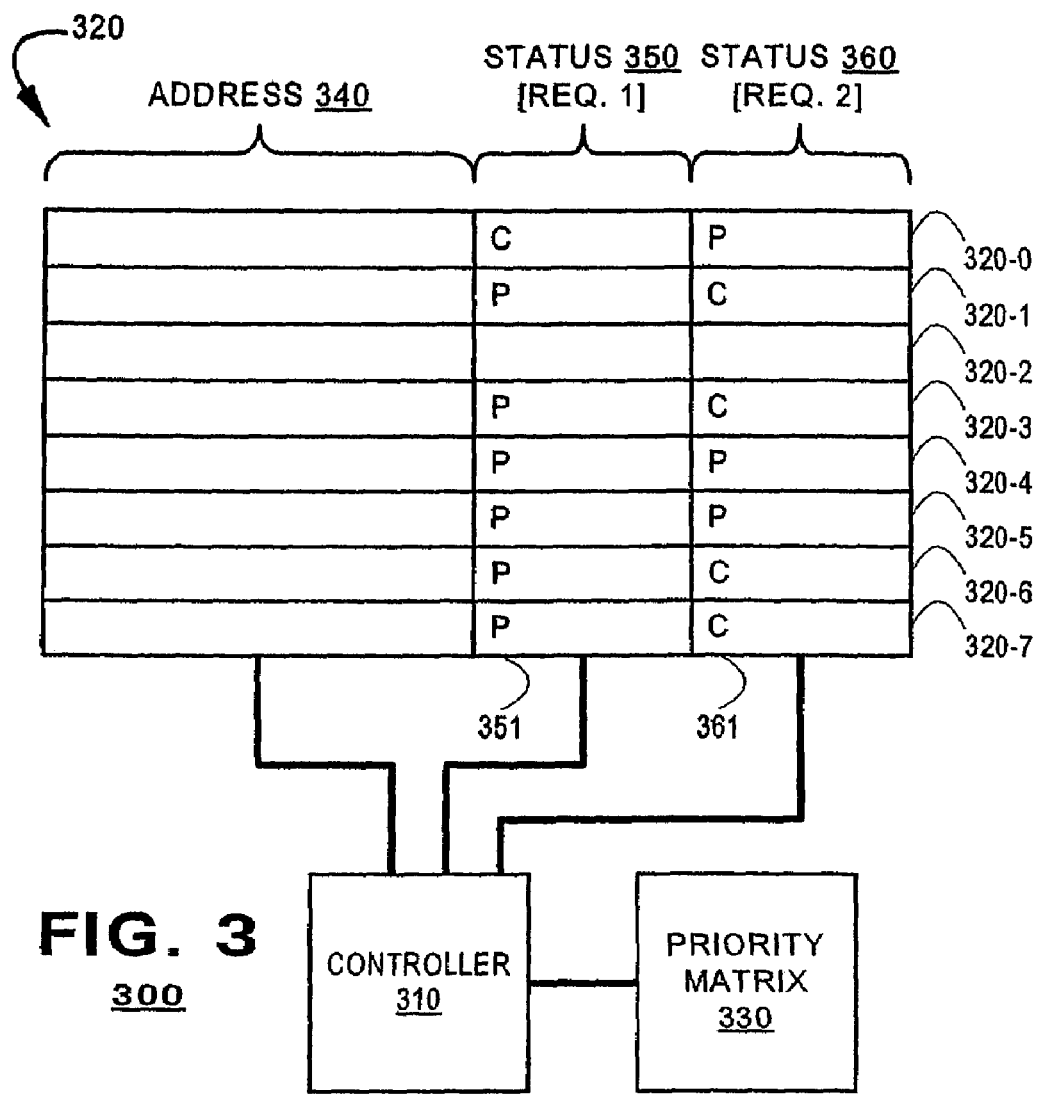
FIG. 3 is a block diagram of an external transaction queue according to an embodiment of the present invention.

FIG. 3 is a block diagram of an external transaction queue 300 of an agent according to an embodiment of the present invention. The external transaction queue 300 may include a controller 310, a plurality of queue registers 320-0 through 320-7 (labeled 320 collectively) and a priority matrix 330. Although eight registers 320 are shown in FIG. 3, the principles of the present invention permit fewer or more registers as desired.

Figure 1:
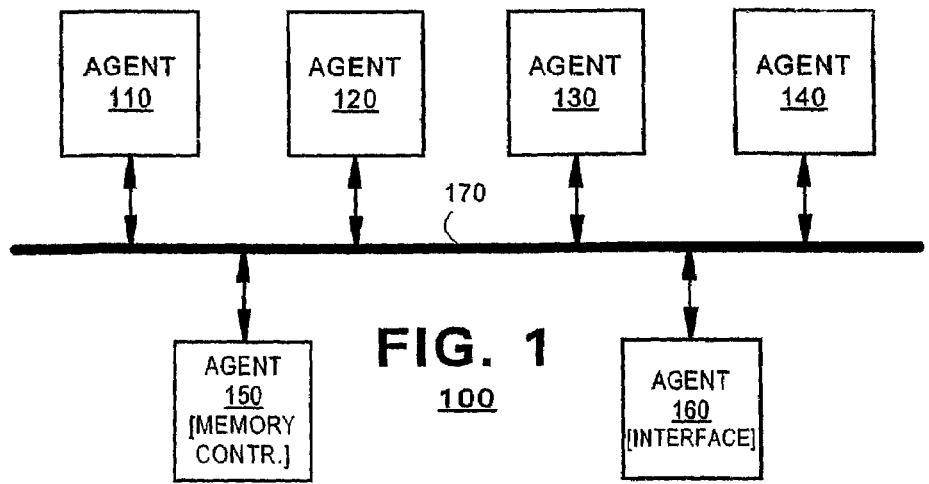
FIG. 1 is a block diagram of a multi-agent computer system, appropriate for use with embodiments of the present invention.

The controller 310 interfaces the external transaction queue 300 to other elements within the agent. The controller 310 may cause transactions to be entered or removed from the queue registers 320 and may write data into fields thereof. The controller 310 also may schedule an order for transactions to be posted on the external bus 170 (FIG. 1). In one embodiment, the controller 310 may be a state machine.

The registers 320 may store data relating to requests in the transaction queue 300. Each queue register 320 may be populated by several fields including an address field 340, a first status field 350 and a second status field 360. The status fields 340, 350 may store administrative information regarding respective transactions. Thus, it is possible that each queue register 320 maintains information about a pair of external bus transactions. The address field 340 may identify a range of external memory addresses to which the requests are directed.

The status fields 350, 360 may identify administrative information regarding each respective transaction. For example, the status fields 340, 350 may identify the status of the transaction—for example, whether the transaction is waiting to be posted on the external bus, whether it has been posted, whether cache coherency results have be received for the transaction and whether the transaction has been completed. Typically, a transaction is cleared from a register 320 when the status fields 350, 360 both indicate that their respective transactions have completed.

The registers 320 also may carry information, either in the status fields or elsewhere, that distinguishes registers storing read requests from those storing write requests and that distinguishes registers that store valid data from those that are available for allocation.

As discussed, an embodiment of the transaction queue 300 may store data for a pair of transactions in each register 320. This dual transaction scheme may be appropriate for agents that perform "blind prefetches" for data. When a core read request causes to be read from external memory, a blind prefetch may cause data from an adjacent memory location also to be read to the agent. Often, a core will use data from a plurality of co-located memory locations. By prefetching data from an adjacent memory location, the data will be available in the faster internal cache if the core were to request data from the prefetched location. Accordingly, blind prefetching can improve agent performance.

In a blind prefetch system, a controller 310 may receive data for a core read request and enter appropriate data in the address field 340 and one of the status fields 350, 360. The controller 310 then may enter data for the blind prefetch into the other of the two status fields 350, 360. As illustrated in FIG. 3, the status fields 350, 360 are marked to reflect which transaction is related to a core request and which is related to a prefetch request. Thus, when a core request is stored in the transaction queue 300, a blind prefetch request may be stored along with it in the transaction queue 300. In the example of FIG. 3, registers 320-0, 320-1, 320-3, 320-6 and 320-7 illustrate possible associations between core read requests and blind prefetches.

The transaction queue 300 also may store data for "patterned prefetch requests" issued by a prefetch queue. In a patterned prefetching system, a controller 310 may receive a patterned prefetch request signal and enter appropriate data in the address field 340 and one of the status fields 350 or 360. The controller 310 also may augment the patterned prefetch request with a blind prefetch of its own and enter data associated with the blind prefetch in the other status field 350, or 360. In this case, the status fields 350, 360 of a register would identify that both requests are prefetch requests. The registers 320-4 and 320-5 in the example of FIG. 3 illustrate patterned prefetch requests and blind prefetch requests stored in the transaction queue 300.

According to an embodiment of the present invention, the priority matrix 330 may determine a schedule of instructions to be posted on the external bus. In a first embodiment, the priority matrix 330 prioritizes core read requests over prefetch requests (of either kind) and prioritizes the prefetch requests over write requests. According to another embodiment of the present invention, the priority matrix 330 may determine a schedule of registers to be allocated within a core.

Figure 4:
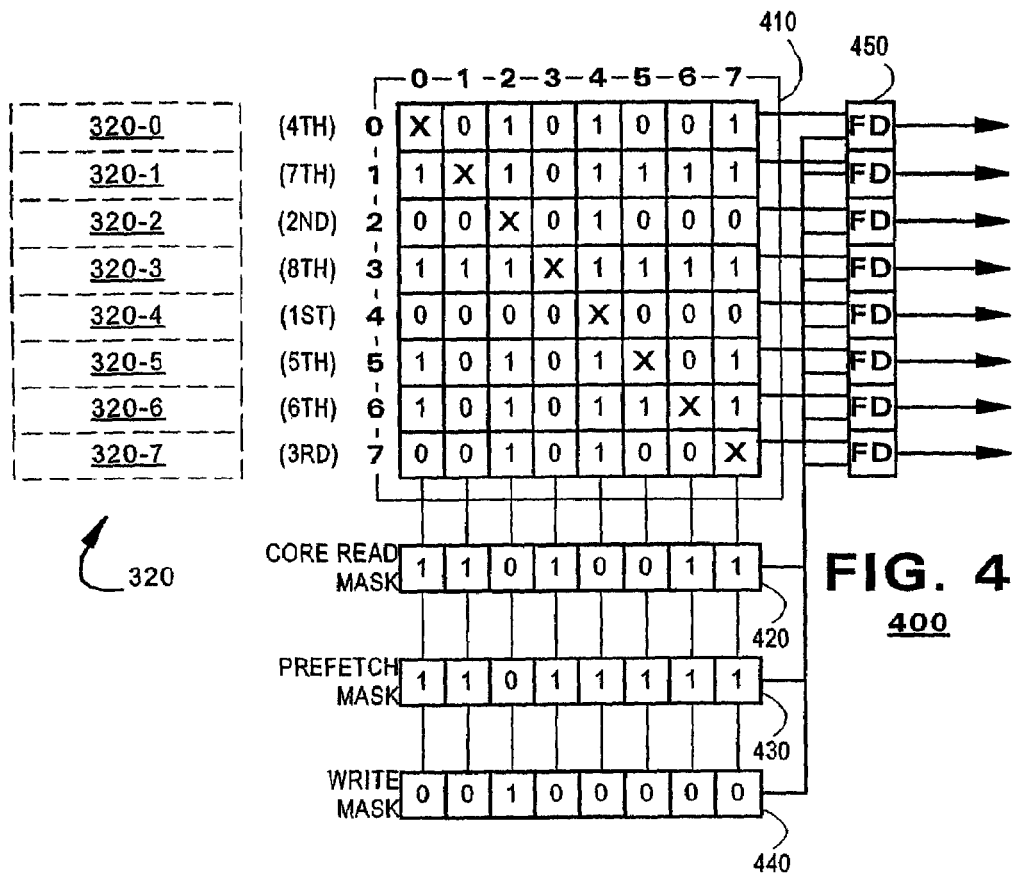
FIG. 4 is a block diagram of a priority matrix according to an embodiment of the present invention.

FIG. 4 illustrates a priority matrix 400 according to an embodiment of the present invention. The priority matrix 400 may be populated by an array 410, a core read mask 420, a prefetch read mask 430, a write mask 440 and flag detectors 450. The array 410 may identify relative ages among the various requests stored in the transaction queue 300 (FIG. 3). The core read mask 420 may identify core read requests stored in the transaction queue that have not yet been posted to the external bus. The prefetch mask 430 may identify prefetch requests stored in the transaction queue that have not yet been posted to the external bus. The write mask 440 may identify write requests stored in the transaction queue that have not yet been posted to the external bus. In one embodiment, the core read mask 420, the prefetch mask 430 and the write mask 400 each may be registers.

For an N register transaction queue, the priority matrix 400 may include an N by N array 410. Each position in the array may store a flag representing a relative priority between two registers. Rows of flags may be associated with respective registers 320 (FIG. 3). When flags are set in a row, it may indicate that other registers store requests that are older than the stored request associated with the respective row. Thus, in the example of FIG. 4, flags are shown as being set in row 0; this represents that a request stored in register 320-0 is younger than requests stored elsewhere in the transaction queue 300 (FIG. 3). In FIG. 4, the age order of the rows is shown parenthetically beside each row. In this example, the flags of row 4 identify the oldest stored request and the flags of row 3 identify the youngest stored request.

Columns within the array 410 may be associated with other registers. For example, column 0 may be associated with register 320-0 (FIG. 3). Flags may be set in column 0 of the array 410 for other rows to indicate relative priorities between those registers and register 320-0. For example, in FIG. 4, flags are shown as being set in column 0 of rows 1, 3 and 5-6. The requests in the corresponding registers (registers 320-1, 320-3, 320-5 and 320-6) are younger than the request stored in register 320-0.

The core read mask 420 may be populated by a plurality of flags, one for each register 320 in the transaction queue. Each position in the core read mask 420 may be associated with a respective column in the array 410. Flags in the core read mask 420 may identify which of the registers 320 store core read requests that have not yet been posted to the external bus. In the example shown in FIG. 4, the core read mask identifies core read requests as being stored in registers 320-0, 320-1, 320-3, 320-6 and 320-7. This example agrees with the example provided in FIG. 3.

The prefetch mask 430 may be populated by a plurality of flags, one for each register 320 in the transaction queue. Each position in the core read mask may be associated with a respective column in the array 410. Flags in the prefetch mask 430 may identify which of the registers 320 store prefetch requests that have not yet been posted to the external bus. The example of FIG. 4 illustrates prefetch requests stored in registers 320-0, 320-1, 320-3, 320-4, 320-5, 320-6 and 320-7. According to an embodiment of the present invention, the prefetch mask 430 need not distinguish between blind prefetch requests and patterned prefetch requests.

The write mask 440 also may be populated by a plurality of flags, one for each register in the transaction queue. Each position in the write mask 440 may be associated with a respective column in the array 410. Flags in the write mask 440 may identify which the registers 320 store write requests that have not yet been posted to the external bus. The example of FIG. 4 identifies a write request stored in register 320-2.

According to an embodiment, the flag positions of the core read mask 420, the prefetch mask 430 and the write mask 440 may be provided in communication with the flag positions in respective columns of the array 410. For example, column 0 of each of the masks 420-440 are provided in communication with all flag positions in column 0 of the array 410. According to an embodiment, the state of flags in either the core read mask 420, the prefetch mask 430 or the write mask 440 may disable the flags in a corresponding flag position. Typically, only one of the masks 420-440 will be enabled at a time. This principle is discussed in greater detail below.

The priority matrix 400 may include flag detectors 450, one for each row in the array 410. Each flag detector 450 may receive a first input from the flag positions of its associated row in the array 410. Each flag detector 450 also may receive an input from a predetermined flag position of each of the masks 420-440. A flag detector 450 may generate an active output if it detects no flags in its associated row in the array 410 but it does detect an active flag from one of the masks 420-440. Again, in an embodiment, only one of the mask 420-440 will be enabled at a time. Only one flag detector 450 should generate an active output. The active output signal identifies a stored request that should be scheduled next by the transaction queue.

According to an embodiment, the masks 420-440 may be enabled according to a relative priority scheme. For example, core read requests may be prioritized over prefetch requests and prefetch requests may be prioritized over write requests. To implement this priority scheme, control logic (not shown) may determine whether the core read mask 420 stores any flags. If so, the core read mask 420 is enabled and the other masks 430, 440 are disabled. The contents of the core read mask 420 determine which flags in the array 410, if any, are disabled. The contents of the core read mask 420 also are input to the detectors 450. The contents of the prefetch mask 430 and the write mask 440 would not be permitted to affect the array 410 or the operation of the detectors 450.

If the core read mask 420 does not store any flags, the control logic may determine whether the prefetch mask 430 stores any flags. If so, the prefetch mask 430 is enabled and the core read mask 420 and write mask 440 are disabled. The contents of the prefetch mask 430 may be applied to the array 410 to disable certain flags. The contents of the prefetch mask 430 also may be input to the detectors 450.

If both the core read mask 420 and the prefetch mask 430 do not store flags, the write mask 440 may be enabled. The contents of the write mask 440 may be applied to the array 410 to disable flags therein. The contents of the write mask 440 also may be input to the flag detectors 450.

By providing the contents of a mask (say, core read mask 420) to the detectors, the mask may prevent a flag detector 450 from generating an active input for a request of a type not recognized by the mask 420. In the example of FIG. 4, although the request stored in row 4 is the oldest in the transaction queue (FIG. 3), the request is not a core read request (there is no flag set in column 4 of the core read mask). Accordingly, some other register stores the oldest core read request and should be prioritized over the request associated with row 4. By inputting the contents of column 4 of the core read request to the flag detector 450 associated with row 4, the flag detector 450 will be inhibited from generating an active output signal.

According to an embodiment, when a mask 420-440 is applied to the array 410, mask flags may cause flags in the array to be disabled. Disabling an array flag prevents its associated flag detector 450 from receiving the flag even though the flag is set. Consider the example shown in FIG. 3. As discussed above, the core read mask 420 prevents the flag detector 450 from identifying row 4 as the oldest request because row 4 is not associated with a core read request. The second oldest request, identified by row 2, also is associated with a write request. Therefore the core read mask 420 will prevent the flag detector 450 associated with row 2 from generating an active output signal. The oldest core read request identified by the priority matrix 400 is third oldest overall. It is identified by row 7. Thus, the flag detectors 450 should identify register 320-7 as storing the next instruction to be scheduled.

When the core read mask 420 is applied to the array 410, the flags of the core read mask 420 determine which columns of flags are enabled. All others are disabled. In the example of FIG. 4, flags in columns 0, 1, 3, 6 and 7 are enabled. Flags in columns 2, 4 and 5 are disabled. Thus, the two flags in row 7 would be disabled when the core read mask 420 is applied to the array 410 because flags are not set in corresponding positions in the core read mask 420. The flag detector 450 for row 7 would generate an active output signal.

When applying the prefetch mask 430 or the write mask 440 to the array 410, flags may be disabled in the same manner as described above for the core read mask 420.

Accordingly, an embodiment of the priority matrix 400 provides an array 410 that maintains an absolute account of the ages of requests stored throughout the transaction queue 300 (FIG. 3). The various masks permit the priority matrix 400 to prioritize among those requests based upon request types, i.e. whether the requests are core read requests, prefetch requests or write requests.

A two-dimensional array 410 provides for simple administration when requests are stored in the transaction queue 300 or cleared therefrom. When a new request is received by the transaction queue 410, an available register may be allocated for the new request (say, register 320-3). With respect to the array, because the new request is the youngest request stored in the transaction queue, it is sufficient to set all flags in the row corresponding to the register (row 3).

Typically, a register is cleared when the transaction queue determines that the requests stored in the register have completed. When a register (say, register 320-7) is cleared, the transaction queue also may cause all flags in a corresponding column of the array 410 to be reset (column 7). By clearing the flags of the corresponding column, the ages of all transactions that are younger than the cleared instruction as represented by the array 410 are incrementally advanced.

The foregoing discussion presents the array 410 as a regular N by N array for storage of flags. According to an embodiment, the array 410 actually may include N fewer flag positions than would a truly square array. FIG. 4 illustrates an X in each position along a main diagonal of the array 410—at positions $(0,0), (1,1), (2,2), \ldots, (N,N)$. Flag positions need not be provided for the main diagonal of the array 410 because there is no need to record age priorities of a register against itself. Accordingly, use of the language "regular array" or the like intends to include both a truly regular array and also an N by N array having flag positions at all locations other than a main diagonal.

Figure 5:
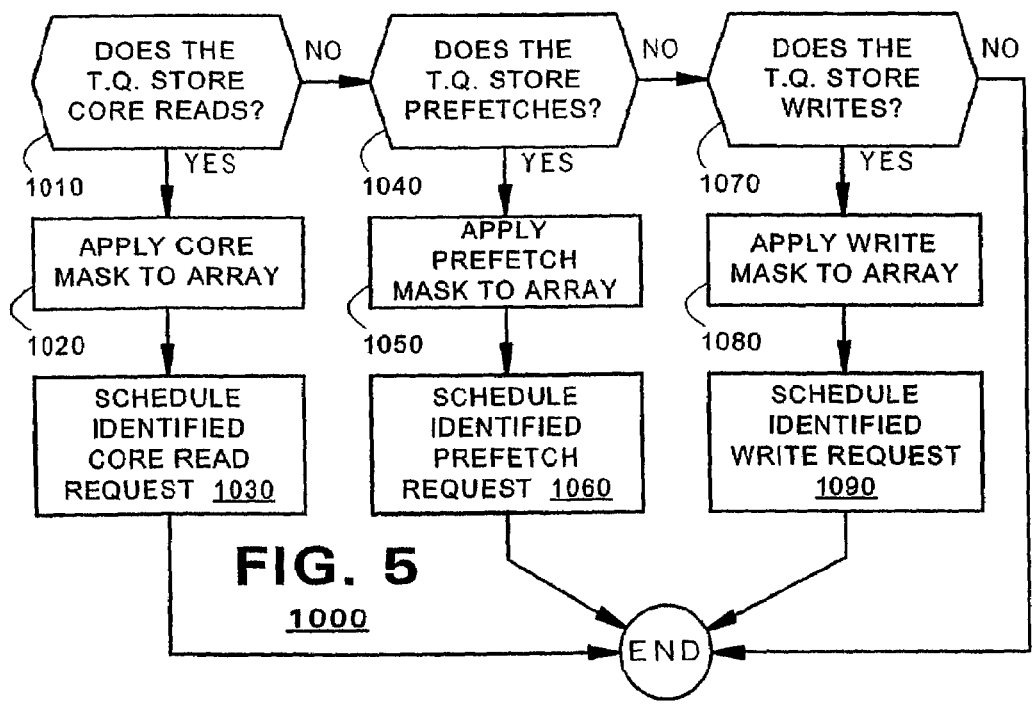
FIG. 5 is a flow diagram of a method of a transaction queue according to an embodiment of the present invention.

FIG. 5 illustrates a method of operation 1000 of the transaction queue 300 according to an embodiment of the present invention. When the transaction queue 300 determines to schedule a new request to be posted to the external bus, it may determine whether the transaction queue stores any non-posted core read requests (Step 1010). If so, the transaction queue may apply the core read mask to the array (Step 1020) and schedule the core read request stored in the identified register (Step 1030).

If the transaction queue does not store any non-posted core read requests, it may determine whether the transaction queue stores any non-posted prefetch requests (Step 1040). If so, the transaction queue may apply the prefetch mask to the array and schedule a prefetch request stored in the identified register (Steps 1050-1060).

If the transaction queue does not store any non-posted prefetch requests, it may determine whether the transaction queue stores any non-posted write requests (Step 1070). If so, the transaction queue may apply the write mask to the array and schedule a write request stored in the identified register (Steps 1080-1090). At the conclusion of steps 1030, 1060, 1090 or if there are no non-posted write requests stored in the transaction queue (Step 1070), the method 1000 may conclude.

The principles of the present invention find application in other scheduling contexts. For example, in addition to scheduling requests to be posted to an external bus, a transaction queue also may communicate with other components within an agent (such as a core) to assist those components to manage resources for data. For example, many read requests will require a component to allocate a register newly received data. Herein, the process of storing newly received data in a register is called a "data fill;" a read or prefetch request that requires only a data fill may be called a "fill request." However, some requests may require that data already stored in an allocated register be evicted prior to the data fill. These requests may be called "eviction requests." Because data eviction and a subsequent data fill takes longer than a data fill alone, a transaction queue may prioritize eviction requests over fill requests for the purposes of scheduling these communications. The principles of the present invention find application with such an embodiment.

Figure 6:
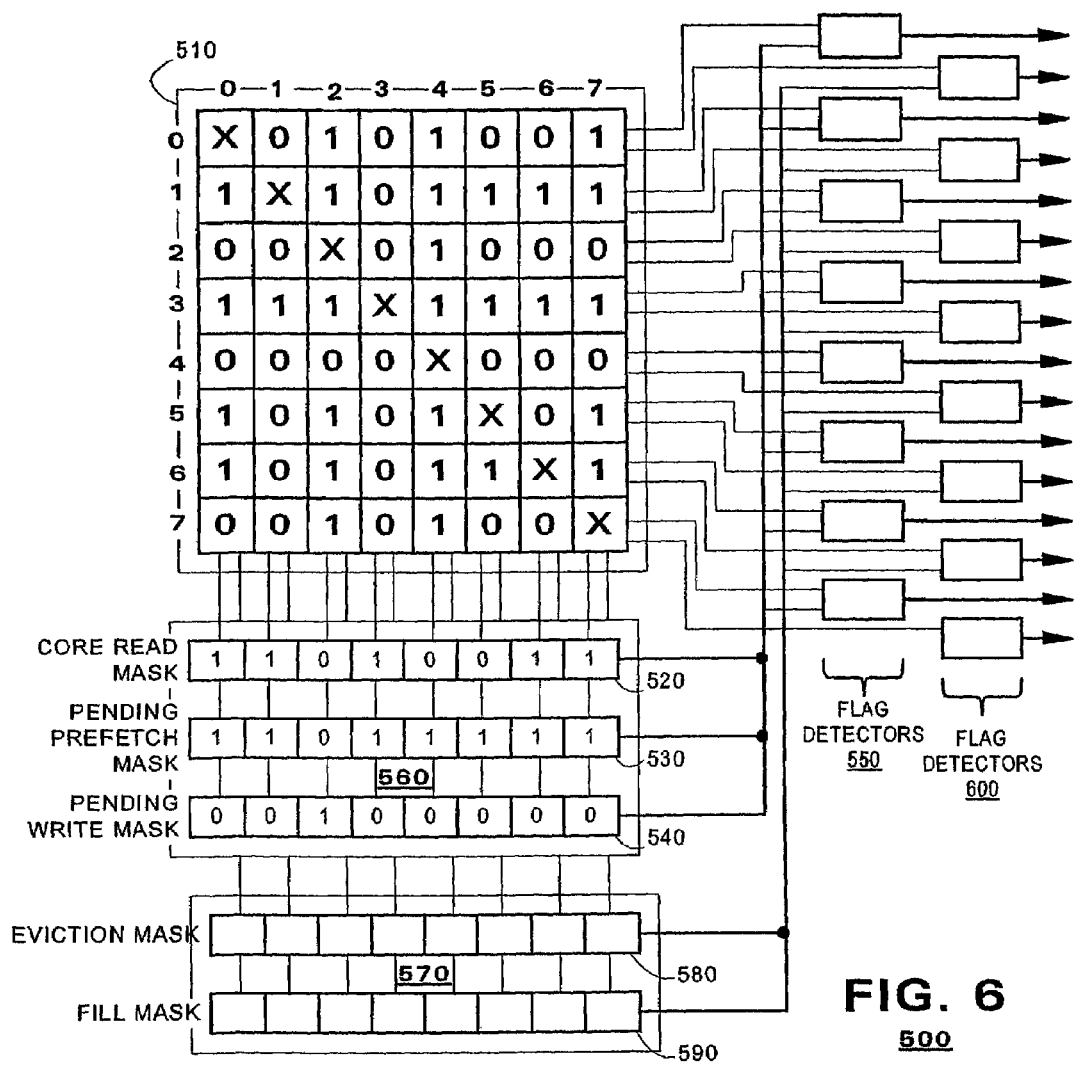
FIG. 6 is a block diagram of a priority matrix in accordance with another embodiment of the present invention.

FIG. 6 illustrates a priority matrix 500 in accordance with another embodiment of the present invention. The priority matrix 500 may be populated by an array 510, a core read mask 520, a prefetch mask 530, a write mask 540 and a first set of flag detectors 550. The core read mask 520, prefetch mask 530, write mask 540 may constitute a first priority register array 560. Only one of the masks 520-540 in the first priority register array will be active at a time. These elements may operate in accordance with previously described embodiments.

The embodiment of FIG. 6 may include a second priority register array 570 that includes an eviction mask 580 and a fill mask 590. As discussed with respect to previous embodiments, only one of the masks 580-590 in the second priority register array 570 will be active at a time. These masks 580, 590 may include a flag position for each register of the transaction queue. Flag positions in each of the masks may be provided in communication with corresponding columns from the array 410.

Flags in the eviction mask 580 may identify transaction queue registers 320 (FIG. 3) that store eviction requests. According to an embodiment, a flag may be set in the eviction mask 580 after a corresponding eviction request has been posted on the external bus. There is no need to set flags for eviction requests while they are pending.

Flags in the fill mask 590 may identify transaction queue registers 320 (FIG. 3) that store fill requests. According to an embodiment, a flag may be set in the fill mask 590 after a corresponding fill request has been posted on the external bus. Alternatively, a flag may be set in the fill mask 590 corresponding to an eviction request after the transaction has scheduled a communication related to the eviction request.

The priority matrix 500 may include a second set of flag detectors 600 associated with the second priority register array 570. Each flag detector 600 may receive a first input from an associated row in the array 510 and a second input from an associated flag position of the active mask 580 or 590 in the second priority register array 570. The flag detector that receives an active flag from the second priority register array 570 but cannot detect an active flag from the array 510 may generate an active output signal. The transaction queue 300 (FIG. 3) may generate the communication based on the register 320 associated with the active flag detector 600.

Each of the flag detectors in the first set 550 or second set 600 of flag detectors may be provided in communication with the flag positions of its associated row in the array 510 over an independent communication path (not shown in FIG. 6).

The principles of the present invention may be extended further. So long as it is consistent with the application for which the invention is to be used, a priority matrix may include any number of priority register arrays as may be required. According to an embodiment, each set of flag detectors may generate an active output signal in parallel with the other set(s) of flag detectors. Thus, when multiple prioritization schemes are provided in multiple priority register arrays, they may operate in parallel.

FIG. 7 is a block diagram illustrating communications between a row 710 in the array (row 2 from FIG. 6) and its associated flag detectors 720, 730, according to one embodiment of the present invention. Consider flag detector 720. According to an embodiment, the array may include a separate parallel data path from each flag position in a row and its associated flag detector 720. Transmission gates 740, 750 may be provided along the data paths. The transmission gates 740, 750 may be controlled by associated flags from a respective priority register array. In one state, a flag from the respective priority register array may cause the transmission gate 740, 750 to be non-conductive, thereby preventing the state of the flag in the row 710 from being input to the flag detectors 720, 730. In another state, a flag from the priority registers may cause the transmission gate 740 to be conductive and permit the state of a flag in the row 710 to be input to the flag detectors 720, 730.

According to an embodiment, for a row k in the array (k from 1 to N), a flag k from the priority register array will be input directly to an associated flag detector 720. In the example of FIG. 7, flag 2 from the first priority register array is shown as input to the first flag detector 720 and flag 2 from the second priority register array is shown as input the second flag detector 730. All other flags j≠k may control transmission gates. Thus, as shown in the example of FIG. 7, flags 0-1 and 3-7 from the first priority register array control transmission gates associated with the flag positions 0-1 and 3-7 from row 710. Similarly, flags 0-1 and 3-7 from the second priority register array may control transmission gates associated with the flag positions 0-1 and 3-7 from row 710.

Several embodiments of the present invention are specifically illustrated and described herein. However, it will be appreciated that modifications and variations of the present invention are covered by the above teachings and within the purview of the appended claims without departing from the spirit and intended scope of the invention.

The invention claimed is:

1. A processor comprising:
a storage area to store priority information to indicate priority of a plurality of memory requests according to age and request type; and
at least one array of flag detectors, wherein the at least one array of flag detectors is to identify one of the plurality of memory requests having highest priority according to flags for age and request type in the storage area.

2. The processor of claim 1, wherein the storage area comprises:
an age array to identify relative ages of the memory requests in order to prioritize the memory requests according to age.

3. The processor of claim 1, wherein the storage area comprises:
a priority register array having a mask register for each of a plurality of request types to identify the request types of the memory requests in order to prioritize the memory requests according to request type, wherein the request type is a core read, a prefetch, or a write.

4. The processor of claim 1, wherein the storage area comprises:
a priority register array having a mask register for each of a plurality of request types to identify the request types of the memory requests in order to prioritize the memory requests according to request type, wherein the request type is a data eviction or a data fill.

5. The method of claim 2, wherein the age array identifies a relative age for each of the plurality of memory requests by setting flags in the age array upon comparison of the corresponding memory request to all other memory requests of the plurality of memory requests.

6. A system comprising:
a processor to send a request to memory according to the priority of the request based on age and type of the request with respect to other memory requests, wherein the request is selected using a priority matrix, the priority matrix comprising:
a two dimensional age array,
a type array, and
a plurality of flag detectors coupled to the age array and type array to identify the request.

7. The system of claim 6, wherein the age array to give priority to requests in descending age order.

8. The system of claim 6, wherein
the type array to give priority to a core read request before a prefetch request and to the prefetch request before a write request.

9. The system of claim 6, wherein
the type array to give priority to a data eviction request before a data fill request.

10. The system of claim 6, wherein the type array is one of a core read mask array, a core write mask array, and a prefetch mask array.

11. The system of claim 6, wherein the type array include a core read mask array, a core write mask array, and a prefetch mask array.

12. The system of claim 11, wherein only one of the core read mask array, the core write mask array, and the prefetch mask array is active at a time.

13. A method comprising:
prioritizing a plurality of memory requests according to age and type of the memory requests using a priority matrix, wherein the priority matrix comprising:
a two dimensional age array,
a type array, and
a plurality of flag detectors coupled to the age array and type array to identify a request with highest priority.

14. The method of claim 13, wherein the prioritizing comprises:

based on age, prioritizing the memory requests from oldest to newest.

15. The method of claim 13, wherein the prioritizing comprises:
based on request type, prioritizing the memory requests in the order of core read requests, prefetch requests, and write requests.

16. The method of claim 13, wherein the prioritizing comprises:
based on request type, prioritizing the memory requests in the order of eviction requests and fill requests.

17. A method comprising:
sending a request to memory based on the priority of the request according to age and request type with respect to other memory requests, wherein the request is selected using a priority matrix, the priority matrix comprising:
a two dimensional age array,
a type array, and
a plurality of flag detectors coupled to the age array and type array to identify the request.

18. The method of claim 17, further comprising:
identifying the relative age of the request;
identifying the request type of the request; and
based on both the age identification and the request type identification, determining the priority of the request.

19. The method of claim 17, further comprising:
identifying the request type as a core read, a prefetch, or a write.

20. The method of claim 19, further comprising:
for the core read and the prefetch request types, further identifying the request type as a data eviction or a data fill.

* * * * *